United States Patent
Kunkel

(10) Patent No.: US 9,654,701 B2
(45) Date of Patent: May 16, 2017

(54) GLOBAL DISPLAY MANAGEMENT BASED LIGHT MODULATION

(71) Applicant: DOLBY LABORATORIES LICENSING CORPORATION, San Francisco, CA (US)

(72) Inventor: Timo Kunkel, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/762,338

(22) PCT Filed: Jan. 22, 2014

(86) PCT No.: PCT/US2014/012568
§ 371 (c)(1),
(2) Date: Jul. 21, 2015

(87) PCT Pub. No.: WO2014/116715
PCT Pub. Date: Jul. 31, 2014

(65) Prior Publication Data
US 2015/0365580 A1  Dec. 17, 2015

Related U.S. Application Data

(60) Provisional application No. 61/756,713, filed on Jan. 25, 2013.

(51) Int. Cl.
*G06K 9/00* (2006.01)
*H04N 5/235* (2006.01)
(Continued)

(52) U.S. Cl.
CPC ........... *H04N 5/2355* (2013.01); *G06T 5/009* (2013.01); *G06T 5/50* (2013.01); *G06T 15/30* (2013.01);
(Continued)

(58) Field of Classification Search
CPC . G06T 2207/20208; G06T 2207/10024; G06T 5/009; G06T 2207/10016;
(Continued)

(56) References Cited

U.S. PATENT DOCUMENTS 6,583,579 B2  6/2003  Tsumura
7,050,122 B2  5/2006  Gibbon
(Continued)

FOREIGN PATENT DOCUMENTS

CN  102243855  11/2011
JP  2002-108305  4/2002
(Continued)

OTHER PUBLICATIONS

NEC Mobile AGCPS, NEC Electronics.
(Continued)

*Primary Examiner* — Li Liu

(57) ABSTRACT

A plurality of input images in an input video signal of a wide dynamic range is received. A specific setting of global light modulation is determined based on a specific input image in the plurality of input images. The specific setting of global light modulation produces a specific dynamic range window. A plurality of input code values in the specific input image is converted to a plurality of output code values in a specific output image corresponding to the specific input image. The plurality of output code values produces the same or substantially the same luminance levels as represented by the plurality of input code values. Any other pixels in the specific input image are converted to different luminance levels in the specific output image through display management.

18 Claims, 9 Drawing Sheets

(51) Int. Cl.
  *H04N 5/57*    (2006.01)
  *H04N 21/431*  (2011.01)
  *G06T 5/00*    (2006.01)
  *G06T 5/50*    (2006.01)
  *G06T 15/30*   (2011.01)
  *G06T 15/50*   (2011.01)
  *H04N 9/64*    (2006.01)

(52) U.S. Cl.
  CPC ......... *G06T 15/506* (2013.01); *H04N 5/2352* (2013.01); *H04N 5/57* (2013.01); *H04N 9/64* (2013.01); *H04N 21/4318* (2013.01); *G06T 2207/10016* (2013.01); *G06T 2207/10024* (2013.01); *G06T 2207/10152* (2013.01); *G06T 2207/20008* (2013.01); *G06T 2207/20208* (2013.01); *G06T 2210/61* (2013.01); *G09G 2320/0271* (2013.01); *G09G 2320/0646* (2013.01)

(58) Field of Classification Search
  CPC ............ G06T 5/007; G09G 2320/0646; G09G 2320/062; G09G 2360/16; G09G 3/3426; G09G 5/10; G09G 5/346
  See application file for complete search history.

(56) References Cited

U.S. PATENT DOCUMENTS

| | | | |
|---|---|---|---|
| 7,053,881 | B2 | 5/2006 | Itoh |
| 7,414,608 | B2 | 8/2008 | Funamoto |
| 7,839,406 | B2 | 11/2010 | Kerofsky |
| 7,982,707 | B2 | 7/2011 | Kerofsky |
| 8,120,570 | B2 | 2/2012 | Kerofsky |
| 8,169,431 | B2 | 5/2012 | Kerofsky |
| 8,203,579 | B2 | 6/2012 | Kerofsky |
| 8,207,932 | B2 | 6/2012 | Kerofsky |
| 9,077,994 | B2 | 7/2015 | Miller |
| 9,368,087 | B2 | 6/2016 | Ninan |
| 2007/0268242 | A1 | 11/2007 | Baba |
| 2009/0109232 | A1 | 4/2009 | Kerofsky |
| 2009/0263037 | A1* | 10/2009 | Qiu ............... G06T 5/009 382/254 |
| 2009/0317017 | A1 | 12/2009 | Au |
| 2010/0053222 | A1 | 3/2010 | Kerofsky |
| 2010/0164976 | A1* | 7/2010 | Choe ............ H04N 5/2351 345/590 |
| 2012/0206470 | A1 | 8/2012 | Frank |
| 2013/0241931 | A1* | 9/2013 | Mai .............. G06T 11/60 345/428 |
| 2013/0286037 | A1* | 10/2013 | Ninan ........... G09G 3/3426 345/589 |
| 2014/0002478 | A1 | 1/2014 | Ballestad |
| 2014/0044372 | A1* | 2/2014 | Mertens ........ H04N 19/46 382/248 |
| 2015/0178904 | A1* | 6/2015 | Boitard ......... G06T 5/007 382/274 |
| 2015/0248747 | A1* | 9/2015 | Atkins .......... G06T 5/10 345/589 |

FOREIGN PATENT DOCUMENTS

| | | |
|---|---|---|
| JP | 2005-242165 | 9/2005 |
| JP | 2009-169592 | 7/2009 |
| JP | 2009-205128 | 9/2009 |
| JP | 2011-227324 | 11/2011 |
| KR | 10-1076449 | 10/2011 |
| WO | 2009/066210 | 5/2009 |
| WO | 2012/026110 | 3/2012 |
| WO | 2012/030620 | 3/2012 |
| WO | 2012/076906 | 6/2012 |
| WO | 2012/118961 | 9/2012 |

OTHER PUBLICATIONS

Park, Hyun-Sang, et al "Ambient-Light Sensor System with Wide Dynamic Range Enhanced by Adaptive Sensitivity Control" 2009 Society for Information Display, Journal of the SID, pp. 681-686.

\* cited by examiner

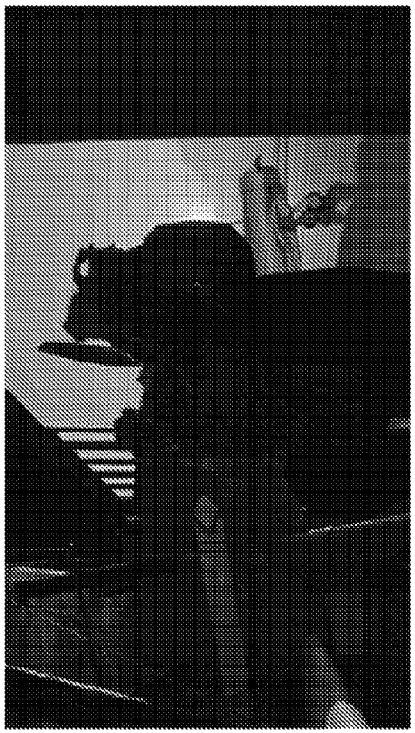

Example 1: Deep blacks, no really bright highlights: Aperture is closed, creating fully addressable deep black levels.

Example 2: The sun is in the picture creating an intense highlight. However, due to having the sun there causes glare in the camera leading to a raised black level. Thus the aperture can be opened without a perceptual loss of DR. Potential outliers can be mapped into range with DM.

FIG. 5

GLOBAL DISPLAY MANAGEMENT BASED LIGHT MODULATION

CROSS REFERENCE TO RELATED APPLICATIONS

This application claims priority to U.S. Provisional Patent Application No. 61/756,713 filed 25 Jan. 2013, which is hereby incorporated by reference in its entirety.

TECHNOLOGY

The present invention relates generally to image data. More particularly, an embodiment of the present invention relates to global display management based light modulation.

BACKGROUND

Some existing displays have a relatively narrow dynamic range (e.g., SDR, LDR, etc.) as compared with a high dynamic range (HDR) display. These displays include projectors or display systems based on Rec.709 and Digital Cinema Initiatives (DCI) specification. The dynamic ranges of these display systems are partially limited to minimum and maximum luminance levels specified in those standards or display capabilities dominant when defining those standards (such as CRT displays) as well as due to other technical limitations in the systems.

Images originally captured by HDR or extended dynamic range cameras may have a scene-referred dynamic range (DR) that is significantly greater than the narrow dynamic ranges supported by the previously mentioned display devices. Display manufacturers attempt to hide the problem by adjusting global display parameters such as minimum luminance level, maximum luminance level, and gamma values to create an impression of higher dynamic ranges. However, these adjustments cannot increase the simultaneous (or instantaneous) contrast in an image based on narrow dynamic range information decoded from an input signal and can at best maintain the same relative contrast in the image from the input signal. Additionally, these techniques tend to produce poor quality in rendering a narrow dynamic range version of HDR images and introduce additional perceptual artifacts such as clipping, banding, color shift, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 5 illustrates two example LDR images as rendered by a LDR display system;

DESCRIPTION OF EXAMPLE EMBODIMENTS

Figure 1:
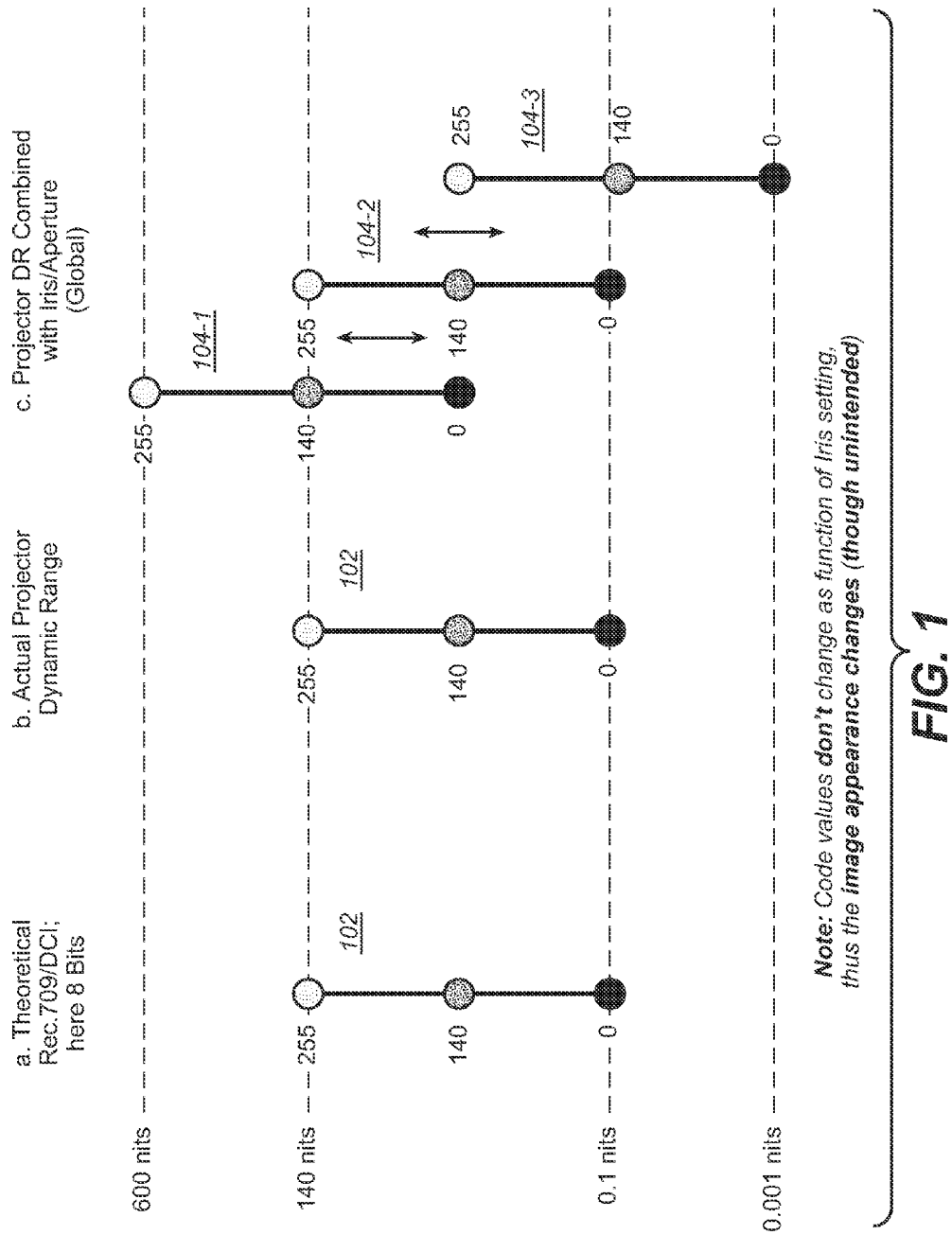
FIG. 1 illustrates example aspects of display systems that support rendering input images of a limited dynamic range.

Example embodiments, which relate to global display management based light modulation, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. NON-PERCEPTUAL ADJUSTMENTS OF ABSOLUTE LUMINANCE LEVELS
3. PERCEPTUAL ADJUSTMENTS OF ABSOLUTE LUMINANCE LEVELS
4. COMPARISON OF DISPLAY SYSTEMS
5. EXAMPLE PROCESSING AND LIGHT MODULATION PATHS
6. NON-PERCEPTUAL ADJUSTMENTS OF ABSOLUTE LUMINANCE LEVELS
7. EXAMPLE DISPLAY SYSTEM
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, input images are mapped to output images with different dynamic range windows (e.g., different instances of a limited dynamic range with adjustment to absolute minimum and maximum luminance levels, etc.), which are produced based on luminance level distributions of the input images.

In an example, when an input image shows one or more salient objects in a dark luminance level distribution, the input image is mapped to an output image with a dark dynamic range window. A large portion of the dark dynamic range window is used to produce the same or substantially (e.g., within 5%, 10%, 20%, etc., of a JND) the same luminance levels for a large number of relatively dark pixels in the input image. The light side of the dark dynamic range window is used to host compressed luminance levels of the remaining relatively light pixels in the input image.

In another example, when an input image shows one or more salient objects in a bright luminance level distribution, the input image is mapped to an output image with a bright dynamic range window. A large portion of the bright dynamic range window is used to produce the same or substantially the same luminance levels for a large number of relatively bright pixels in the input image. The dark side of the bright dynamic range window is used to host compressed luminance levels of the remaining relatively dark pixels in the input image.

Input images in a video input signal can be perceptually coded. Techniques as described herein map a large number of input pixels that capture salient content of an input image of a wide dynamic range to the same or substantially the same luminance levels in a corresponding output image of a limited dynamic range. Techniques as described herein allow pixels with luminance levels outside or at the fringe of a dynamic range window to be compressed via display management to a maximum extent, instead of merely being clipped. As compared with other approaches, the approach under techniques as described herein maintains perceptual qualities of input images in output images to a greater extent.

Techniques as described herein can also be used to individually globally modulate one or more primary channels (e.g., red, green, blue or other) of an adopted color space while mapping input images of a wide dynamic range to corresponding output images of a limited dynamic range. The individual modulations of the primary channels reshape the color balance in color gamut, and are beneficial if certain colors (hue and saturation areas in images) are more dominant than others. For example, in a scene with dominant reds and only a few muted blues, the blue channel LEDs can be dimmed more relative to other channels while maintaining the ability to express the muted blues perceptually correct, as a large gamut toward blue is not needed.

A limited dynamic range display system with global light modulation capability can be implemented cost efficiently relative to a wide dynamic range display system. Under techniques as described herein, the limited dynamic range display system can achieve deep blacks as well as rich highlights in input images from an extended dynamic range (EDR), a visual dynamic range (VDR, as described below) or HDR input signal. Further, from a statistical point of view, many input images' dynamic ranges lie in some dynamic range windows or some instances of a limited dynamic range with adjustment to absolute minimum and maximum luminance levels. Only a few pixels may need to be mapped or compressed with display management in this approach. Since the dynamic range of human vision is often reduced when extremely bright and dark elements are simultaneously visible at the same time due to glare in the eye, luminance compression for outlying luminance levels may be performed without overly impacting perceptual quality of output images.

Techniques as described herein can also be used to accomplish other benefits including but not limited to: saving energy, extending lifespans of involved light source elements and electronic components (e.g. LEDs).

In some embodiments, mechanisms as described herein form a part of a media processing system, including, but not limited to: a handheld device, game machine, television, laptop computer, tablet computer, netbook computer, cellular radiotelephone, projectors, cinema system, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Non-perceptual Adjustments of Absolute Luminance Levels

FIG. 1 illustrates example aspects of display systems that support rendering input images of a low dynamic range or LDR (102). An example of LDR is, without limitation, defined in Rec.709 or Digital Cinema Initiatives (DCI) specification. A relatively narrow dynamic range (e.g., 104) of such a display system is caused by minimum and maximum luminance levels (e.g., 0.1 nit and 140 nits, respectively) that can be set simultaneously (e.g., for an image frame) at a given time.

The problem of a relatively narrow range such as the dynamic range (104) may be alleviated by varying absolute minimum and maximum luminance levels up and down over the time based on overall luminance levels of images. At any given time, both of the absolute minimum and maximum luminance levels move either up or down together while preserving the relative luminance levels in between.

As shown in FIG. 1, the absolute minimum and maximum (0.1 nit and 140 nits, respectively) of such a display system may be shifted up to a dynamic range (104-1) of higher absolute minimum and maximum luminance levels, down to a dynamic range (104-3) of lower absolute minimum and maximum luminance levels, or maintained at the same, non-shifted dynamic range (104-2) as dynamic range (104). Relative luminance levels in input images may be represented in a particular code space of a certain bit depth (e.g., 8-bit code space, 10-bit code space, etc.). The change of absolute minimum and maximum luminance levels in the display system by using a global iris, aperture, light focusing or dispersion components, light modulating devices in an optical path, etc., does not alter relative luminance levels represented in input images. The same relative code values are used to drive rendering the input images in the display system.

In some embodiments, the relative luminance levels may be represented by 8-bit code values. A code value (e.g., 0) with a first setting of absolute minimum and maximum luminance levels may refer to a first absolute luminance level (e.g., 0.001 nits) at a first time for a first image frame, whereas the same code value (0) with a second different setting of absolute minimum and maximum luminance levels may refer to a second different absolute luminance level (e.g., 0.1 nits) at a second different time for a second different image frame.

Human vision may not perceive a difference between two luminance levels if the two luminance levels are not sufficiently different from each other. Instead, human vision only perceives a difference if the luminance levels differ no less than a just noticeable difference (JND). Due to perceptual nonlinearity of human vision, the amounts of individual JNDs are not uniformly sized or scaled across a range of luminance levels, but rather vary with different individual luminance levels.

In some embodiments, image data in a video signal input to a display system may or may not be perceptually encoded. Even if input image data is perceptually encoded, after absolute minimum and maximum luminance levels are elevated or lowered, relative luminance levels in the input image data give rise to absolute luminance levels that are also shifted up and down. The shifted absolute luminance levels typically do not match with perceptual nonlinearity of human vision at shifted absolute minimum and maximum luminance levels (e.g., 104-1 or 104-3) of FIG. 1, other than between 0.1 nit and 140 nits as specified in Rec. 709 or DCI specification, etc.). This mismatch between the perceptual non-linearity of human vision for different ranges of absolute minimum and maximum luminance levels cannot be simply corrected by adjusting global parameters such as gamma values for input images.

Consequently, the adjustment of absolute minimum and maximum luminance levels in the display system by using a global iris, aperture, light focusing or dispersion components, light modulating devices in an optical path, etc., causes image appearance changes and visual artifacts. Those appearance changes and visual artifacts include but not limited to any of: clipping, loss of original perceivable resolution, loss of correct color perceptions, banding, false contour, color shift in dark regions of an image, etc.

3. Perceptual Adjustments of Absolute Luminance Levels

Under techniques as described herein, an LDR display system (e.g., a SDR display system, etc.), a mobile device, a tablet computer, etc., is configured to receive a video signal input that provides images of a relatively wide dynamic range, much wider than an instantaneous dynamic range supported (or expected) by the LDR display system. For example, the instantaneous dynamic range supported by the display system may be comparable to or no better than that defined in Rec. 709, DCI specification, etc., whereas the dynamic range supported by the video signal input may be an HDR, VDR, etc. In some embodiments, the video signal input may carry image data based on perceptual quantization encoding techniques developed by Dolby Laboratories, Inc., of San Francisco, Calif., etc.

Figure 2A:
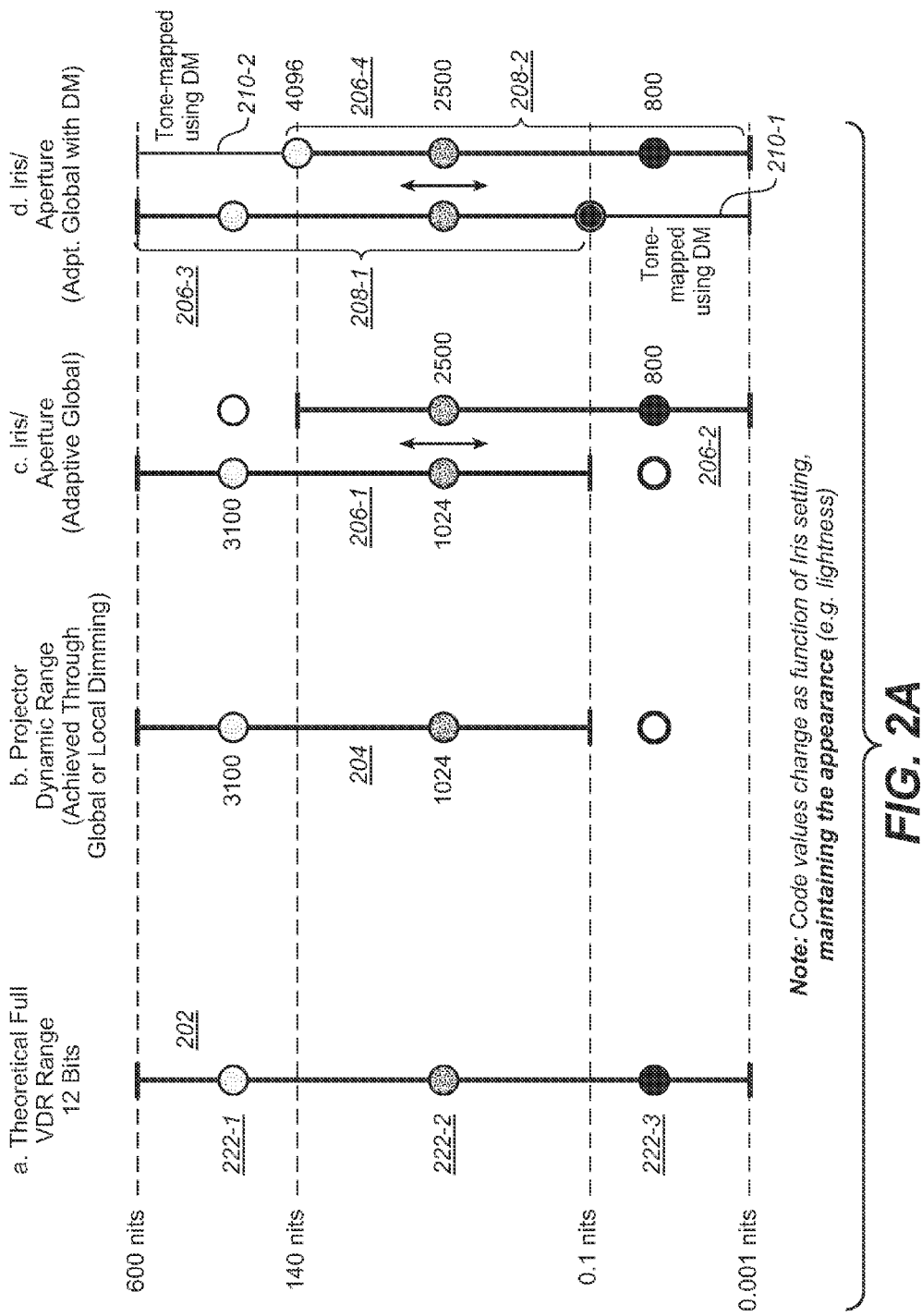
FIG. 2A and FIG. 2B illustrate example mappings from input images of a wide dynamic range to output images of a limited dynamic range.

As illustrated in FIG. 2A, the wide dynamic range (202) encoded in the video signal input as received by the LDR display system can cover a full dynamic range that a wide variety of high-end contemporary display systems (of dynamic ranges much greater than the LDR of the display system) are capable of supporting. An example of wide dynamic range can be but is not limited to 0.001 to 600 nits. As used herein, the term "VDR" or "visual dynamic range" may refer a dynamic range (e.g., represented by 10-bit code values, 12-bit code values, 14-bit code values, etc.) wider than a standard dynamic range (e.g., represented by 8-bit code values, 10-bit code values, etc.), and may include, but is not limited to, a wide dynamic range up to the instantaneously perceivable dynamic range and color gamut which human vision is maximally capable of perceiving at an instant. Supported luminance levels in the VDR may be distributed in such a way that they are optimally spaced or quantized to match the perceptual nonlinearity of human vision.

Using a video signal input of the wide dynamic range (202), all three example ranges of input code values 222-1, 222-2 and 222-3 can be represented, as illustrated in FIG. 2A. However, the dynamic range of the display system is limited to a proper subset of the wide dynamic range (202) at any given time. For example, as illustrated in FIG. 2A, the dynamic range of the display system covers a dynamic range window comparable to a portion (204) of the wide dynamic range (202) with a particular setting of global light modulation (e.g., a setting of a global iris, etc.). As used herein, the term "dynamic range window" refers to an instance of a limited dynamic range generated at a given time under a specific setting of global light modulation; a luminance level in the dynamic range window typically is generated with an output code value under the specific setting of global light modulation; the dynamic range window as generated by a LDR display system at any given time is (e.g., significantly) narrower than the wide dynamic range (e.g., 202) of a video input signal. Thus, with the dynamic range window comparable to the portion 204 of the wide dynamic range (202), the upper code values (222-1 and 222-2) in the wide dynamic range (202) may be displayed while the lowest code value (222-3) in the wide dynamic range (202) is out of the dynamic range window and will be clipped.

In some embodiments, a LDR display system under techniques as described herein is configured with global light modulation capability. A display system as described herein is configured to determine a particular setting of global light modulation to produce a specific (e.g., optimal, etc.) dynamic range window for a specific VDR input image. The dynamic range window comprises specific absolute minimum and maximum luminance levels corresponding to the specific setting of global light modulation. The display system produces different dynamic range windows for different VDR input images. In an example, for a first VDR input image 206-1, the display system sets a first setting of global light modulation and produces a limited dynamic range that is represented by a first dynamic range window. In another example, for a second VDR input image 206-2, the display system sets a second setting of global light modulation and produces a limited dynamic range that is represented by a second dynamic range window.

VDR input images may, but are not required to, cover the entire wide dynamic range (202). Even if two VDR input images (e.g., 206-3 and 206-4) cover the same portion of the wide dynamic range (202), one (e.g., 206-3) of the VDR images may contain more highlights than the other (e.g., 206-4) of the VDR images.

Some VDR input images (e.g., 206-1 and 206-2) may take up only portions of the wide dynamic range (202) which respectively fit within specific dynamic range windows produced by specific settings of global light modulation. As illustrated in FIG. 2A(c), a first VDR input image (206-1) may take up a first portion of the wide dynamic range (202) that fits within a first dynamic range window produced by a first setting of global light modulation. Similarly, a second VDR input image (206-2) may take up a second portion of the wide dynamic range (202) that fits within a second dynamic range window produced by a second setting of global light modulation. A display system as described herein is configured to convert input code values in a VDR input image—the first VDR input image 206-1 or the second VDR input image 206-2 in the present example—to output code values (or system-specific code values) such that the output code values under a corresponding setting of global light modulation (the first or second setting of global light modulation in the present example) produce the same or substantially the same luminance levels as the input code values perceptually coded in the VDR input images, even though in some embodiments the numeric values of the output code values would be different from those of the corresponding input code values.

As used herein, "input code values" refer to code values of one or more channels of an adopted color space in a VDR input image; the input code values may be represented by values in a code space of relatively high bit length (e.g., 10 bits, 12 bits, 14 bits, etc.). As used herein, "output code values" refer to (e.g., standard-based, system-specific, etc.) code values of one or more channels of an adopted color space (which may or may not be the same as the code space adopted for the VDR input image) in an LDR image; the output code values may be represented by values in a (e.g., standard-based, system-specific, etc.) code space of relatively low bit length (e.g., 8 bits, 10 bits, etc.).

Some VDR input images (e.g., 206-3, 206-4, etc.) may take up a large portion of the wide dynamic range (202) that does not fit within any dynamic range window produced by any setting of global light modulation. As illustrated in FIG. 2A(d), a third VDR input image (206-3) may take up the entire wide dynamic range (202) that does not fit within a third dynamic range window (not shown) optimally selected for the third VDR input image (206-3) by the display system or any dynamic range window produced by any setting of global light modulation. Similarly, a fourth VDR input image (206-4) may take up the wide dynamic range (202) that does not fit within a fourth dynamic range window (not shown) optimally selected for the fourth VDR input image (206-4) by the display system or any dynamic range window produced by any setting of global light modulation.

It should be noted that even though the third VDR input image (206-3) may cover the same dynamic range as the fourth VDR input image (206-4), dynamic range windows determined by the display system for these two VDR input images (206-3 and 206-4) can be different. For example, the third VDR input image (206-3) overall may contain more highlights and fewer dark regions than the fourth VDR input image (206-4), the third dynamic range window selected for the third VDR input image (206-3) may cover a brighter portion of the wide dynamic range (202) than the portion of the wide dynamic range (202) covered by the fourth dynamic range window selected for the fourth VDR input image (206-4).

In some embodiments, the display system is configured to divide the dynamic range of a VDR input image (e.g., 206-3, 206-4, etc.) into an input code value range for perceptual preservation and zero or more input code value ranges for display management. The number, locations and sizes of these ranges set for the VDR input image (e.g., 206-3, 206-4, etc.) are determined based on specific image data of the VDR input image (e.g., 206-3, 206-4, etc.) and may vary from image to image.

Referring to FIG. 2A(d), the third dynamic range window determined for the third VDR input image (206-3) may cover the upper portion of the wide dynamic range (202). In some embodiments, the display system is configured to divide the third dynamic range into an input code value range (e.g., 208-1) for perceptual preservation located at the upper part of the wide dynamic range (202), and an input code value range (210-1) for display management below the input code value range (208-1). The number, locations, and sizes of these ranges (208-1 and 210-1) set for the third VDR input image (206-3) are determined based on the image data of the third VDR input image (206-3).

Similarly, the fourth dynamic range window determined for the fourth VDR input image (206-4) of FIG. 2A may cover the lower portion of the wide dynamic range (202). In some embodiments, the display system is configured to divide the fourth dynamic range into an input code value range (e.g., 208-2) for perceptual preservation located at the lower part of the wide dynamic range (202), and an input code value range (210-1) for display management above the input code value range (208-2). The number, locations, and sizes of these ranges (208-2 and 210-2) set for the fourth VDR input image (206-4) are determined based on the image data of the third VDR input image (206-4).

Pixels in the VDR input image (e.g., 206-3, 206-4, etc.) with input code values within the input code range for perceptual preservation are referred to as "in-range" pixels and are given output code values (or system-specific code values) such that the output code values, under a particular setting of global light modulation for a particular dynamic range window, produce the same or substantially the same luminance levels as the input code values perceptually coded in the VDR input image (e.g., 206-3, 206-4, etc.), even though the numeric values of the output code values can differ from those of the corresponding input code values. Pixels in the VDR input image (e.g., 206-3, 206-4, etc.) with input code values within the zero or more input code value ranges—outside the input code range for perceptual preservation—are referred to as "out-of-range" pixels and are given output code values (or system-specific code values) such that the output code values, under a particular setting of global light modulation for a particular dynamic range window, may not produce the same luminance levels as the input code values perceptually coded in the VDR input image in the VDR input image (e.g., 206-3, 206-4, etc.). Display management operations may be performed on the out-of-range pixels.

In some embodiments, output code values (or system-specific code values) may have a different density than that of input code values in the wide dynamic range (202). The "in-range" pixels may be given perceptually accurately adjusted values. For example, output code values that generate closest luminance levels in the LDR display system to the luminance levels represented by input code values may be selected to represent the input code values in rendering operations of the LDR display system.

Figure 2B:
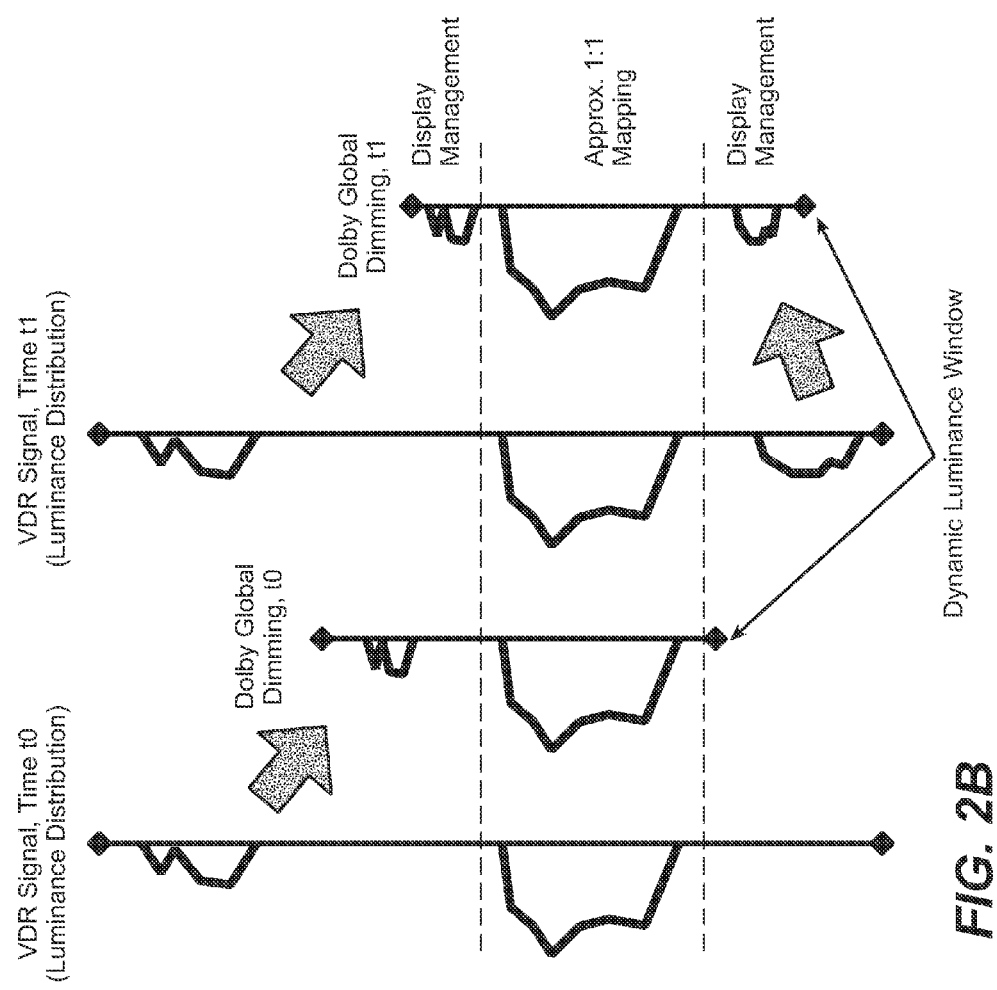

As illustrated in FIG. 2B, at t0, a VDR input image with a VDR luminance (level) distribution is received. The VDR luminance level distribution comprises a salient portion located below and a small highlight portion located above. This VDR input image is converted into a SDR output image with a dynamic range window as determined based on the VDR luminance level distribution under techniques as described herein (e.g., through Dolby global dimming, etc.). A large portion (or the salient portion) of the VDR luminance level distribution at the lower luminance levels, corresponding to in-range pixels, is approximately mapped into SDR luminance levels in the SDR output image. A small portion (or the highlight portion) of the VDR luminance level distribution at the high luminance levels, corresponding to out-of-range pixels, is compressed into SDR luminance levels through display management such as tone-mapping, etc.

At t1, a different VDR input image with a different VDR luminance (level) distribution is received. The different VDR luminance level distribution comprises a salient portion located in the middle, a small highlight portion located above, and a small dark portion located below. This different VDR input image is converted into a different SDR output image with a different dynamic range window (lower than the dynamic range window for the VDR input image at t0) as determined based on the VDR luminance level distribution under techniques as described herein (e.g., through Dolby global dimming, etc.). A large portion (or the salient portion) of the VDR luminance level distribution at the mid-range luminance levels are approximately mapped into SDR luminance levels in the SDR output image. Both the small highlight portion and the small dark portion of the VDR luminance level distribution at the high and low luminance levels are compressed into SDR luminance levels through display management such as tone-mapping, etc.

Under techniques as described herein, because pixel values of the in-range pixels in the VDR input images are either maintained or adjusted perceptually accurately in the perceptual quantization space, output LDR images comprising output code values—which drive rendering operation of the LDR display system—preserve much of the original perceptual appearance of the VDR input images, even though the output LDR images are of a limited dynamic range supportable by the LDR display system.

4. Comparison of Display Systems

Figure 3:
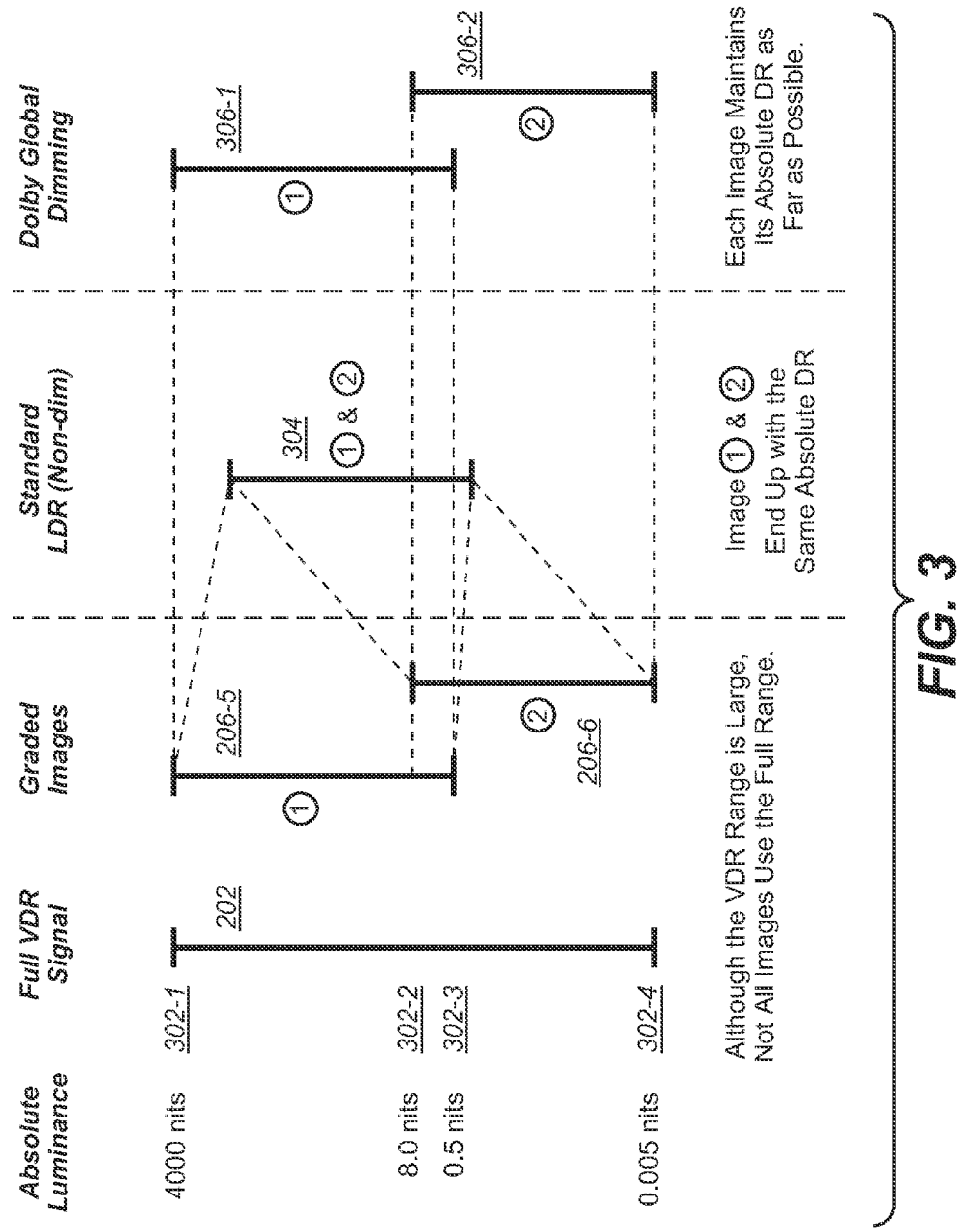
FIG. 3 compares LDR display systems with or without global light modulation capability.

FIG. 3 compares LDR display systems with or without global light modulation capability. Not all VDR input images use an entire wide dynamic range (e.g., 202) of a video input signal such as a full VDR range, etc. As illustrated in FIG. 3, a fifth VDR input image (206-5) has luminance levels in a fifth portion of the wide dynamic range (202), for example, between 0.5 and 4000 nits. Similarly, a sixth VDR input image (206-6) has luminance levels in a sixth portion of the wide dynamic range (202), for example, between 0.005 and 8.0 nits. For a display system without global light modulation, both the fifth VDR input image (206-5) and the sixth VDR input image (206-6) are mapped to the same limited dynamic range (304) of the LDR display system, leading to undesirable perceptible appearance changes and visual artifacts relative to the VDR input images (206-5 and 206-6). It should be noted that such an LDR display system may optionally still have local dimming capability; however, absolute minimum and maximum of the dynamic range of the LDR display system are fixed.

In sharp contrast, for a display system with global light modulation, each of the fifth VDR input image (206-5) and the sixth VDR input image (206-6) is mapped to a specific dynamic range window (306-1 or 306-2) of the LDR display system as determined based on luminance levels represented in that VDR input image. Further, output code values that are used by the display system's rendering operations are perceptually accurately adjusted/changed to produce the same or substantially the same luminance levels as represented in the VDR input image, leading to a faithful reproduction of perceptible appearance relative to the VDR input images (206-5 and 206-6). It should be noted that such a LDR display system may optionally still have local dimming capability; however, absolute minimum and maximum of the dynamic range of the LDR display system are not fixed, but are adjustable with settings of global light modulation to generate different dynamic range windows as appropriate.

A dynamic range of a VDR input image can also be divided by the LDR display system with global modulation capability into an input code value range for perceptual preservation and zero or more input code value ranges for display management. The input code value range for perceptual preservation can be assigned to a salient part (e.g., a middle section of the VDR image, a section in which actions are detected, etc.) of the VDR input image or a relatively large number of in-range pixels. Even when the entire dynamic range of the VDR input image cannot be fitted into an optimal dynamic range window with any setting of global light modulation for the VDR input image, a relatively large number of pixels or a salient part of the VDR input images are perceptually accurately preserved/adjusted in a corresponding LDR image to be rendered by the LDR display system. Thus, a relatively large amount of perceptual information in the VDR input images are maintained in the LDR images as rendered by the LDR display system, in comparison with other approaches including but not limited to display systems without global light modulation capabilities.

5. Example Processing and Light Modulation Paths

Figure 4:
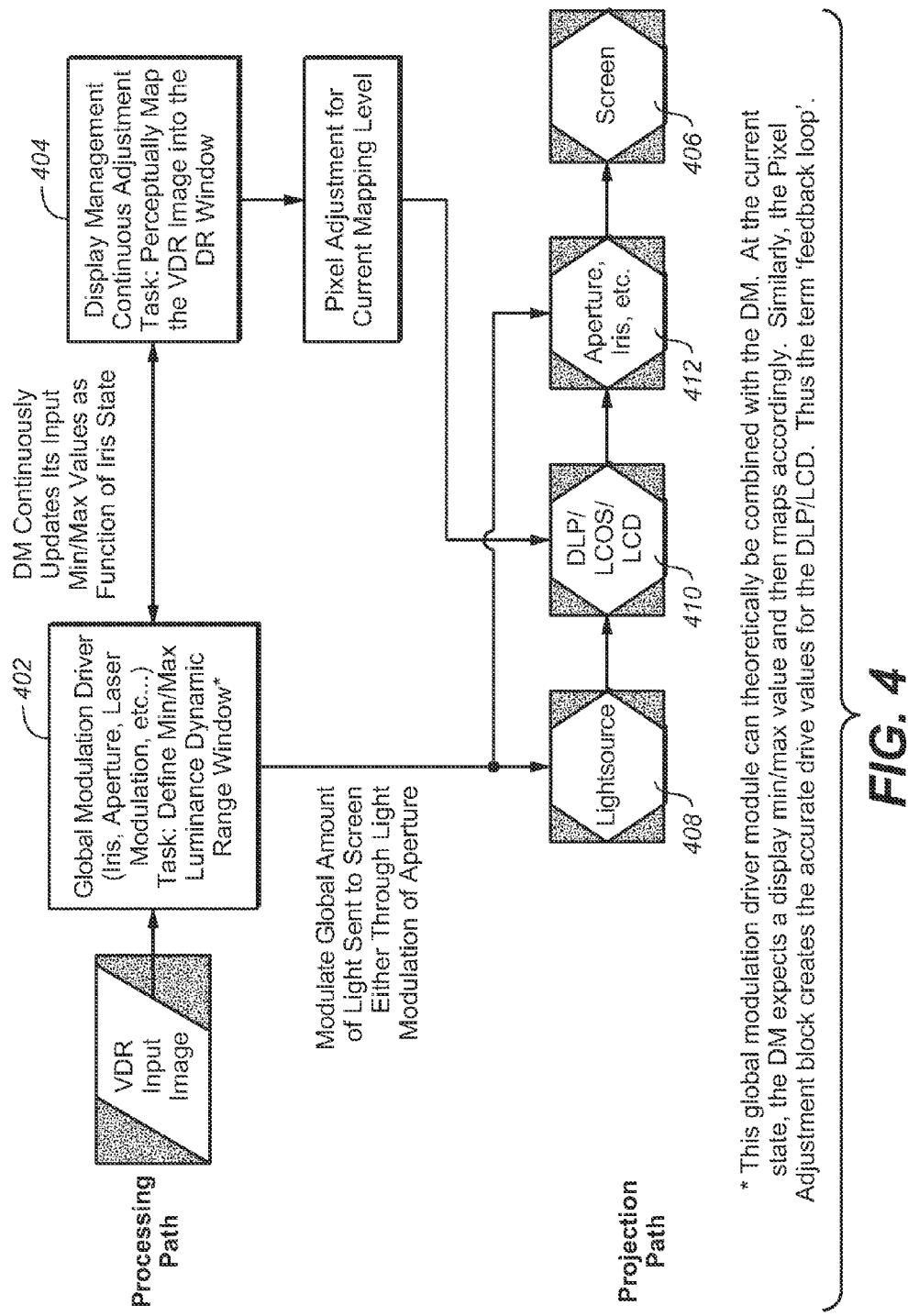
FIG. 4 illustrates example processing and light modulation paths in an LDR display system with global light modulation capability.

FIG. 4 illustrates example processing and light modulation paths in an LDR display system with global light modulation capability. In some embodiments, the processing path includes a global modulation driver (402) and a display management module (404) that are respectively configured to control light generation components, light modulation components (410), light control components (412), etc., in the projection path for the purpose of rendering LDR images on a display screen (406). The light modulation components (410) may be, but are not limited to, Digital Light Processing (DLP)/Liquid Crystal on Silicon (LCoS)/Liquid Crystal Display (LCD) based light modulation components. The light control components (412) may be but are not limited to a global aperture, a global iris, etc., and are controlled in part by a setting of global light modulation. The LDR images are derived to a large extent by perceptually accurately adjusting input code values in VDR input images which may be received in a video signal input of a wide dynamic range (202).

In the processing path, a VDR input image in the video signal input is analyzed by the global modulation driver (402) to determine a luminance level distribution (e.g., histogram, tables, etc.) of the VDR input image, and to determine an optimal dynamic range window (which is an instance of the LDR under a specific setting of global light modulation) to which input code values in the VDR input image are mapped. The determination of the optimal dynamic range window includes a determination of absolute minimum and maximum luminance levels to be generated by a global light source module (408) and/or by global light modulating components such as a global aperture, a global iris, etc. The global modulation driver (402) can be configured to perform light source control operations as well as perform control operations of the global light modulation components (410), and to modulate global amount of light to illuminate one or more local modulation layers for the purpose of rendering an LDR image—which corresponds to the VDR input image—on the display screen (406). In some embodiments, the global modulation driver (402) can also be configured to perform laser modulation control as a part of global or local light modulation.

The display management module (404) of FIG. 4 can be configured to continuously update its input parameters such as the minimum and maximum luminance levels of optimal dynamic range windows. In some embodiments, the minimum and maximum luminance levels of the optimal dynamic range windows vary as functions of settings of global light modulation from image to image. Specific settings of global light modulation depend on image data of specific VDR input images and are used to place the light source module (408) and light modulation components (410) in specific states to produce specific minimum and maximum luminance levels and optimal dynamic ranges.

The display management module (404) of FIG. 4 can be configured to perform continuous adjustment between the input code values in VDR input images and output code values in corresponding LDR images. The display management module (404) can be configured to perceptually map input code values in a VDR input image into a specific optimal dynamic range window determined based on the VDR input image. Pixel adjustments generated or determined by the display management module (404) can be used to control pixel-level or pixel-block-level light modulation components (410) to render on a display screen (406) a perceptually correct LDR image corresponding to the VDR input image.

To avoid "pumping" artifacts (e.g., unintended oscillations or sudden shifts of absolute minimum and maximum luminance levels in consecutive dynamic range windows, etc.), temporal dampening can be applied so that two different dynamic range windows can transition into each other relatively gradually, for example, in a time interval 0.5 second, 1 second, 3 seconds, etc., rather than suddenly, perceptually speaking.

The display system is configured to determine/select a dynamic range window for a VDR input image (e.g., 206-1, 206-2, 206-3, 206-4 etc.) and to identify/determine an input code value range for perceptual preservation in the dynamic range window. For example, the display system can determine a luminance level distribution of the VDR input image, select the dynamic range window to cover as much in the luminance level distribution as possible, and determine, based on the display system's global light modulation capability, a particular setting of global light modulation to produce the dynamic range window. Luminance levels in the luminance level distribution may be weighted differently. Luminance levels that have relatively large numbers of pixels are assigned relatively high weights in relation to other luminance levels that have relatively small numbers of pixels. The display system may be biased to select the dynamic range window to cover more luminance levels that have relatively numerous pixels. Further, the display system can use the luminance level distribution to identify the input code value range for perceptual preservation in the dynamic range window.

The display system may be configured to minimize the number of "out-of-range" pixels outside the input code value range for perceptual preservation and/or minimize the number of levels that need luminance compression. The display system may be configured to minimize the number of luminance levels that needed luminance compression (e.g., through tone-mapping, display management operations including but not limited to those developed by Dolby Laboratories, Inc., San Francisco, Calif., etc.).

The display system can perceptually and accurately adjust the input code values of in-range pixels to output code values, and map the input code values of out-of-range pixels to output code values with compressed luminance levels through tone-mapping, etc.

Operations to select optimal dynamic range windows to cover at least salient portions of VDR input images and operations to set settings of global light modulation are correlated. A feedback loop may be implemented between the display management module (404) and the global modulation driver (402) to continuously select dynamic range windows and set settings of global light modulation. As a result, perceptually correct images can be maintained even when the overall luminance levels of VDR input images change over time.

VDR luminance levels of in-range pixels of a VDR input image can be perceptually maintained by LDR luminance levels in one or more portions of a dynamic range window reserved for perceptual preservation. Depending on the dynamic ranges of the VDR input images as received by the display system, it is possible that certain VDR luminance levels of the VDR input image still lie outside of the selected dynamic range window and thus still end up clipped or compressed. The clipping and compression of some VDR luminance levels can be perceptually hidden by mapping those VDR luminance levels into LDR luminance levels in some portions of the dynamic range window reserved for display management. At any given time, zero or more portions of a dynamic range window reserved for display management and one or more portions of the dynamic range window reserved for perceptual preservation constitute the entire dynamic range window.

There are several processes in the human visual system that support the efficiency of the techniques as described herein. For example, the perceptible dynamic range of the human visual system is often reduced when both extremely bright and dark elements are visible at the same time due to glare in the eye (which could similarly happen in camera lenses). Simultaneous contrast can improve the black perception, which to some extent is independent of absolute black and white levels of the display system.

FIG. 5 illustrates two example LDR images as rendered by a LDR display system. The dark image on the left is derived from a first VDR input image with a narrow set of low luminance levels (or deep black levels) without much bright highlight. The bright image on the right is derived from a second VDR input image with a wide set of both low and high luminance levels.

Techniques as described herein can be used to generate the dark image on the left from the first VDR input image without significantly compressing luminance levels of pixels of the scene. An aperture or iris that controls minimal and maximum luminance levels may be set to a relatively small opening or may be closed for a relatively longer time period in relation to a time period during which the aperture or iris is open. Correspondingly, the optimal dynamic range window determined based on the first VDR input image creates fully addressable black levels for all or substantially all of the VDR luminance levels in the first VDR input image.

The sun in the bright image on the right creates an intense highlight. The glare caused by the presence of the sun leads to a raised black level for the second input VDR image. Accordingly the base dark black level of the LDR of the display system is raised at the time of rendering the LDR image corresponding to the second VDR input image. The raising of the dark black level is accomplished in part by shifting a LDR upwards from a relatively dark dynamic range window selected for the first input VDR image to a relatively bright dynamic range window selected for the second input VDR image. The aperture or iris that controls minimal and maximum luminance levels may be set to a relatively large opening or may be opened for a relatively longer time period in relation to a time period during which the aperture or iris is closed.

Techniques as described herein can also be used to generate the bright LDR image on the right by perceptually accurately maintaining/adjusting medium or high VDR luminance levels of the second VDR input image in an input code value range for perceptual preservation into output code values in a portion of an optimal dynamic range window reserved for perceptual preservation.

A relatively few pixels in the second input VDR image may be potential outliers relative to the optimal dynamic range window as determined based on the second input VDR image and can be mapped, compressed, and/or even clipped, into the optimal dynamic range window by a display management module (404). Some low VDR luminance levels of the second input VDR image may be compressed into zero or more portions of optimal dynamic range window reserved for luminance compression.

As shown in FIG. 5, perceptual fidelity of the VDR input images are relatively better maintained under the techniques as described herein than otherwise. The dark image on the left preserves to a great extent the entire dynamic range of the first input VDR image, whereas the bright image on the right preserves to a great extent a significant part (salient part) of the second VDR image due to the presence of a more visible sun. Since human vision naturally loses some ability to differentiate low luminance levels when facing simultaneous strong glares, perceptual fidelity of low luminance levels in the bright image on the right is not sacrificed much by the luminance compression of the low luminance levels in the second input VDR image and remains satisfactory/acceptable.

6. Non-perceptual Adjustments of Absolute Luminance Levels

Figure 6:
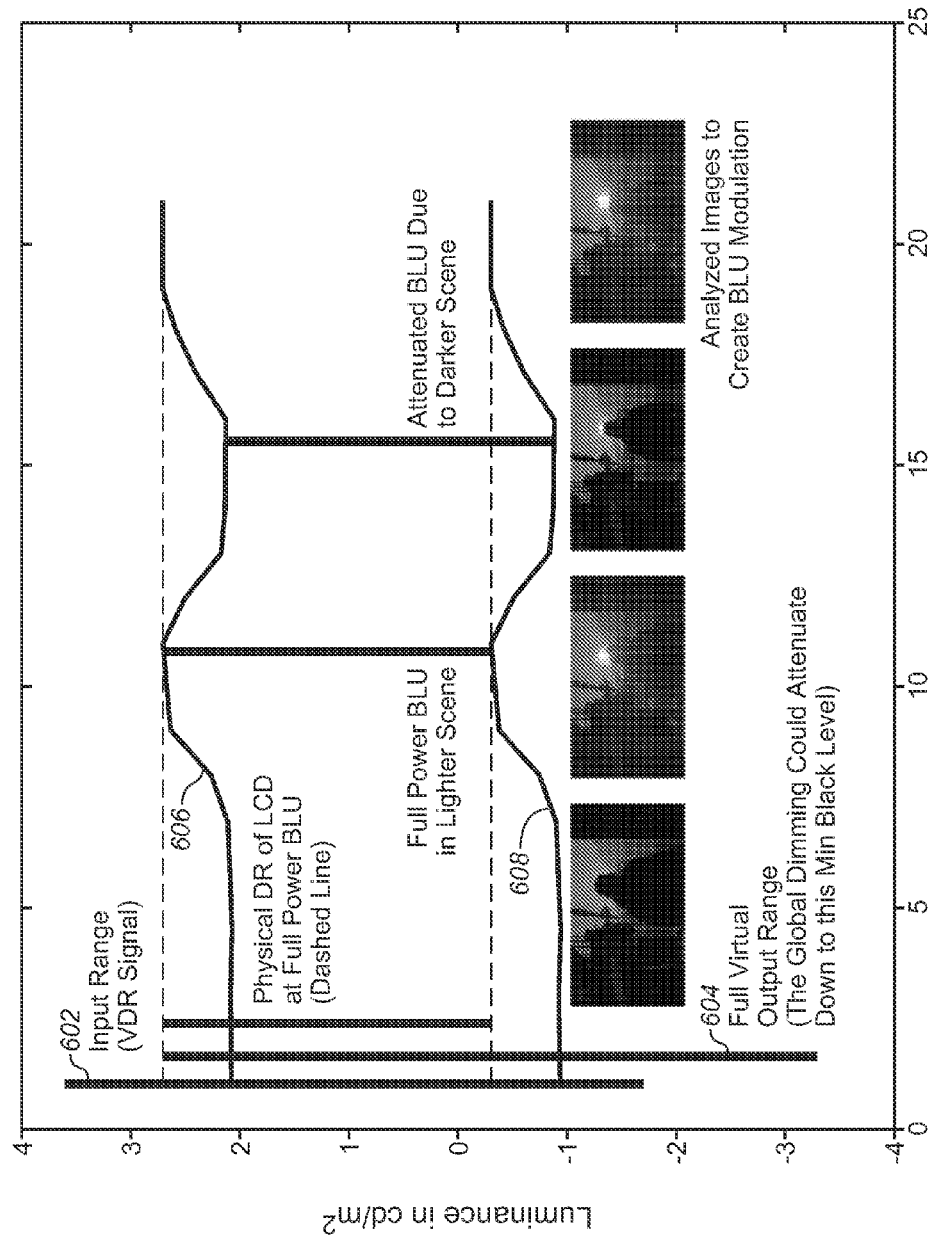
FIG. 6 illustrates an example sequence of dynamic range windows for a sequence of input VDR images in a scene.

FIG. 6 illustrates an example sequence of dynamic range windows for a sequence of input VDR images in a scene. The dynamic range windows and their maximum and minimum luminance values are functions of the VDR input images. The VDR input images in a video signal input covers an input dynamic range 602 along the vertical axis in FIG. 6 (absolute luminance levels in a logarithmic domain with a basis of ten (10)). An LDR display system can select/set global modulation settings to generate individual narrow dynamic range windows at individual times that collectively cover a relatively wide output dynamic range 604 over the time.

VDR input images in the scene are analyzed by a global modulation driver (402) in the LDR display system to determine dynamic range windows as a function of the VDR input images. Parameters such as the maximum luminance value (on a maximum luminance value curve 606), the minimum luminance value (on a minimum luminance value curve 608), etc., define each dynamic range window in the determined dynamic range windows and are shared with a display management module (404) of the LDR display system, the latter of which maps input code values in a VDR input image into output code values in a corresponding LDR image with that dynamic range window.

A light source component (408) such as a backlight unit (BLU) and light control components (412) such as a global aperture, a global iris, etc., in the display system can be controlled with specific settings on an image-by-image basis to modulate global light output for the LDR image to which the VDR input image is mapped.

For the purpose of illustration, from frame 1 to frame 7 (as indicated by the horizontal axis in FIG. 6), the dynamic range windows as determined by the global modulation driver (402) approximately span from $10^{-1}$ to $10^2$ cd/m$^2$. From frame 9 to 12, the dynamic range windows as determined by the global modulation driver (402) span from $10^{-0.25}$ to $10^{2.75}$ cd/m$^2$. Even though a VDR input image (e.g., frame 10, frame 11, etc.) might be better represented with a dynamic range window with a higher maximum than $10^{2.75}$ cd/m$^2$, the maximum luminance level of the physical dynamic range of the display system (e.g., DLP, LCD, etc.) with a full power light source and maximum light output allowance is still capped to $10^{2.75}$ cd/m$^2$, which is the maximum of the example display system is configured to produce.

Techniques as described herein can be used to accomplish a variety of objectives in displaying operations. These objectives include but are not limited to: maximizing perceived dynamic ranges and increasing perceptual correctness in a display system with global light modulation, reducing energy consumption, reducing heat generation, preventing LED overheating, etc. In an example, if a certain amount of energy use per hour cannot be exceeded, techniques as described herein can be used to dim the light source in a LDR system to an intensity level as appropriate while maintaining the perceptual fidelity of the VDR input image as much as possible given the circumstances.

In another example, LED light sources in a LDR display system may need to be prevented from being overdriven for a prolonged time, in order to protect the LED light sources from heat-related permanent damages. Techniques as described herein can be used to slowly dim (or temporally dampen) the intensity level of the LED light sources, if the LED light sources have been overdriven for a preconfigured time. The resultant decrease of luminance can be perceptually compensated for by using the techniques as described herein while minimizing adverse impact on the perceptual fidelity of the VDR input image as much as possible given the circumstances.

As used herein, the term "luminance level" or "luminance value" may be used interchangeably, and may refer to a quantized luminance level in a specific dynamic range. As used herein, the term "nit" or its abbreviation "nt" may relate or refer, synonymously or interchangeably, to a unit of image intensity, brightness, luma and/or luminance that is equivalent or equal to one (1) candela per square meter (or cd/m$^2$).

For the purpose of illustration, it has been described that a relatively wide dynamic range is a VDR. The invention, however, may not be so limited. Techniques can be used for preserving perceptual fidelity of (input) images of a non-VDR dynamic range in a display system that supports a relatively narrow dynamic range The relatively wide dynamic range may be represented by (input) code values residing in a 10 bit, 12 bit, 13 bit, 14 bit, or higher code space, whereas the relatively narrow dynamic range may be represented by (LDR) code values residing in a 14 bit, 13 bit, 12 bit, 10 bit, 8 bit or lower code space.

For the purpose of illustration, it has been described that input code values of a relatively wide dynamic range are mapped to output code values of a relatively narrow dynamic range. It should be noted that a code value as described herein may be a value in a luminance channel of a color space, but also may be pixel values in other channels other than luminance channels. A code value, whether directly representing a luminance level or partly representing a contribution to a luminance level, may be perceptually adjusted, mapped, etc., for example, in order to maintain perceptual fidelity of colors under techniques as described herein. Additionally, optionally, or alternatively, a color space (e.g., RGB, RGB+, etc.) other than one (e.g., YCbCr, etc.) comprising a luminance channel (or otherwise encoded luminance information) may be used to encode images of a relatively wide dynamic range and/or images of a relatively narrow dynamic range to which the images of the relatively wide dynamic range are mapped. Techniques as described herein can be used to individually globally modulate one or more color channels of an adopted color space other than a luminance channel when generating output images of different dynamic range windows based on corresponding input images of a wide dynamic range. The individual modulations of the color channels can take into account respective luminance contributions from each of the color channels and reshape the color balance in color gamut. If certain colors (e.g., hue and saturation areas in images, etc.)

are more dominant than others, for example, in a scene with dominant reds and only a few muted blues, the blue channel LEDs can be dimmed more relative to other channels. The individual modulations of the color channels provide more levels to different salient portions (muted blue in the present example) of the individual color channels and maintain the ability to render the individual color channels as well as the whole image perceptually correctly on the display system.

Additionally or optionally, techniques as described herein may be used in conjunction with local dimming. For example, local dimming may be used to control individual light sources, generate different local luminance levels in different regions of an image, and provide a relatively wide dynamic range to a display system. Global light modulation techniques may be used to adjust global maximum and minimum luminance levels and to produce different instances of the relatively wide dynamic range generated by local dimming to cover an even wider dynamic range of a video input signal. Perceptual mapping and display management techniques as described herein can be used to maintain the perceptual quality of the images rendered in a local dimming display system of a dynamic range narrower than that of the video input signal.

7. Example Display System

Figure 7:
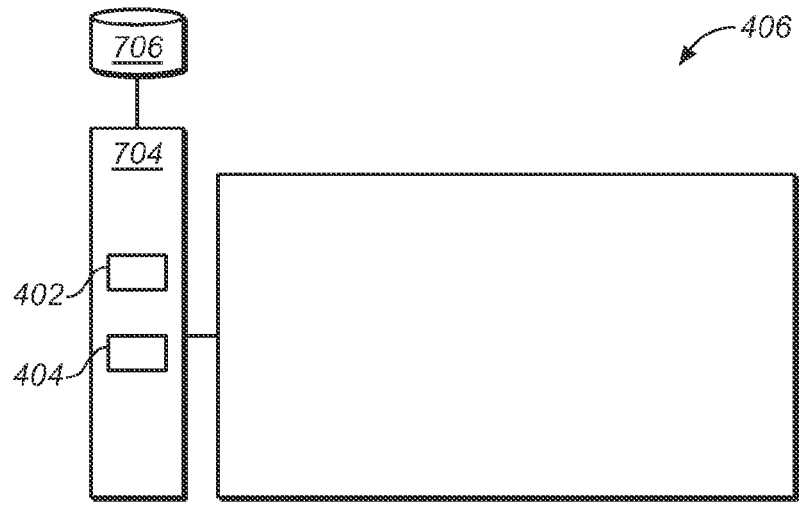
FIG. 7 illustrates an example display system.

FIG. 7 illustrates an example display system comprising a display screen (406) and a display controller (704) comprising a global modulation driver (402) and a display management module (404), in accordance with an embodiment. Display controller 704 can be configured to control one or more light sources and system components that modulate light output for the purpose of rendering LDR images on the display screen (406). Display controller 704 can be operatively coupled with an image data source (706) and is configured to receive image data from the image data source (706). Display controller (704) can be configured to receive input images of a relatively wide dynamic range in the image data from the image data source (706). The image data can be provided by the image data source (706) to the display system in a variety of ways including from over-the-air broadcast, a set-top box, a networked server coupled to the display system, and/or a storage medium.

The image data as received by the display system may initially be in any of a plurality of formats (standard based, proprietary, extension thereof, etc.) and/or may be derived from any of a plurality of image sources (camera, image server, tangible media, etc.). Examples of image data to be encoded include, but are not limited only to, raw or other high bit-depth image(s). The raw or other high bit-depth image(s) may come from a camera, a studio system, an art director system, another upstream image processing system, an image server, a content database, etc. The image data may include, but is not limited only to, that of digital photos, video image frames, 3D images, non-3D images, computer-generated graphics, etc. The image data may comprise scene-referred images, device-referred images, or images with various dynamic ranges. Examples of image data may include a high-quality version of original images. The raw or other high bit-depth image(s) may be of a high sampling rate used by a professional, an art studio, a broadcast company, a high-end media production entity, etc. Image data may also be in whole or in part computer generated, or may even be obtained based in whole or in part from existing image sources such as old movies and documentaries.

The image data may comprise floating-point or fixed-point image data, and may be in any color space. In an example embodiment, the input images may in an RGB color space. In another example embodiment, the input images may be in a YCbCr color space. In an example, each pixel in an image as described herein comprises floating-point pixel values for all channels (e.g., red, green, and blue color channels in the RGB color space) defined in the color space. In another example, each pixel in an image as described herein comprises fixed-point pixel values for all channels (e.g., 16 bits or higher/lower numbers of bits fixed-point pixel values for red, green, and blue color channels in the RGB color space) defined in the color space. Each pixel may optionally and/or alternatively comprise downsampled pixel values for one or more of the channels in the color space relative to other channels in the color space.

8. Example Process Flows

Figure 8:
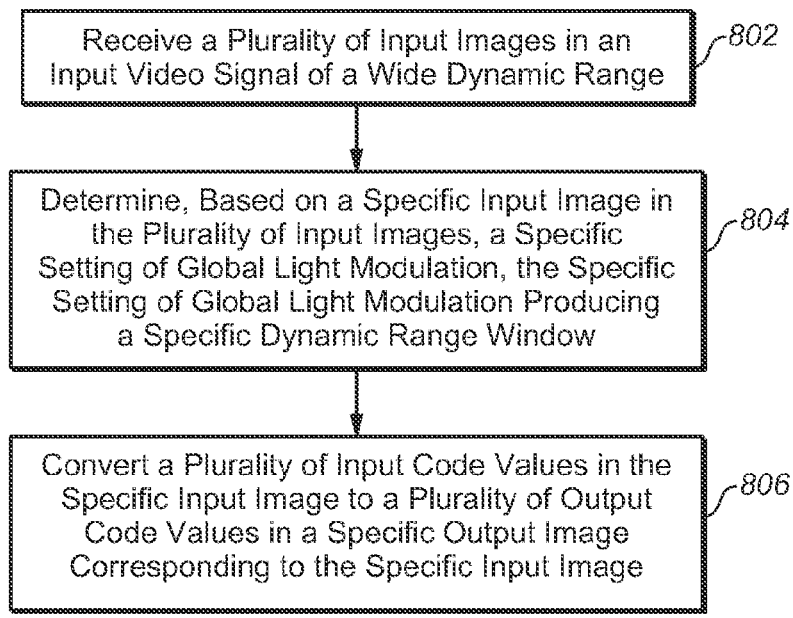
FIG. 8 illustrates an example process flows.

FIG. 8 illustrates an example process flow according to an embodiment of the present invention. In some embodiments, one or more computing devices or components may perform this process flow. In block 802, a display system receives a plurality of input images in an input video signal of a wide dynamic range.

In block 804, the display system determines, based on a specific input image in the plurality of input images, a specific setting of global light modulation. The specific setting of global light modulation produces a specific dynamic range window. An output luminance level range represented by the specific dynamic range window is a proper subset of a luminance level range represented by the wide dynamic range.

In block 806, the display system converts a plurality of input code values in the specific input image to a plurality of output code values in a specific output image corresponding to the specific input image. The plurality of output code values produces the same or substantially the same luminance levels as represented by the plurality of input code values. The plurality of output code values being within the specific dynamic range window.

In an embodiment, the plurality of input code values represents one or more salient portions of the specific input image.

In an embodiment, the specific input image is perceptually encoded with input code values independent of display systems.

In an embodiment, the display system is further configured to convert one or more remaining input code values in the specific input image to one or more output code values in the specific output image. The one or more output code values produce different luminance levels as represented by the one or more input code values. The one or more output code values are within the specific dynamic range window.

In an embodiment, at least one of the wide dynamic range or the specific dynamic range window represents a dynamic range with an upper limit having a value of: less than 500 nits, between 500 nits and 1000 nits, inclusive, between 1000 and 5000 nits, inclusive, between 5000 nits and 10000 nits, inclusive, between 10000 nits and 15000 nits, inclusive, or greater than 15000 nits.

In an embodiment, the dynamic range window represents a dynamic range with a lower limit having a value of: less than 0.001 nits, between 0.001 nits and 0.1 nits, inclusive, between 0.1 nits and 1 nits, inclusive, between 1 nits and 10 nits, inclusive, between 10 nits and 100 nits, inclusive, or greater than 100 nits.

In an embodiment, the display system is further configured to render the specific output image on a display screen with the specific setting of global light modulation.

In an embodiment, the display system is further configured to perform: determining, based on a second specific input image in the plurality of input images, a second specific setting of global light modulation, the specific setting of global light modulation producing a second specific dynamic range window, the second specific dynamic range window being different from the specific dynamic range window; converting a second plurality of input code values in the second specific input image to a second plurality of output code values in a second specific output image corresponding to the second specific input image, the second plurality of output code values producing the same or substantially the same luminance levels as represented by the second plurality of input code values.

In an embodiment, the specific input image comprises the same maximum and minimum luminance levels as the second specific input image; the specific dynamic range window comprises maximum and minimum luminance levels different from those of the second specific input image.

In an embodiment, the video input signal comprises image data encoded in one of a high-resolution high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU), CIE color spaces as defined by International Commission on Illumination (CIE) including but not limited to CIELAB and CIELUV, YCbCr color spaces, an IPT uniform color space, an LCh color space, color spaces related to spectral encoding, etc.

In an embodiment, the specific setting of global light modulation comprises one or more specific settings for one or more of light source components or global light modulation components.

In some embodiments, light illumination on a pixel-level or pixel-block-level light modulation layer with the specific setting of global light modulation is uniform. In different embodiments, light illumination on a pixel-level or pixel-block-level light modulation layer with the specific setting of global light modulation is non-uniform.

In an embodiment, the wide dynamic range comprises input code values of a code space with a bit depth of at least one of: less than 12 bits; between 12 bits and 14 bits, inclusive; at least 14 bits; or 14 bits or more.

In an embodiment, the specific dynamic range window is represented by output code values of a code space with a bit depth of at least one of: less than 8 bits; between 8 bits and 12 bits, inclusive; or 12 bits or more.

In some embodiments, the specific input image comprises an image-specific dynamic range that fits within the specific dynamic range window. In different embodiments, the specific input image comprises an image-specific dynamic range that does not fit within the specific dynamic range window.

In various embodiments, an apparatus, a computing system, a display system, etc., performs any or a part of the foregoing methods as described.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
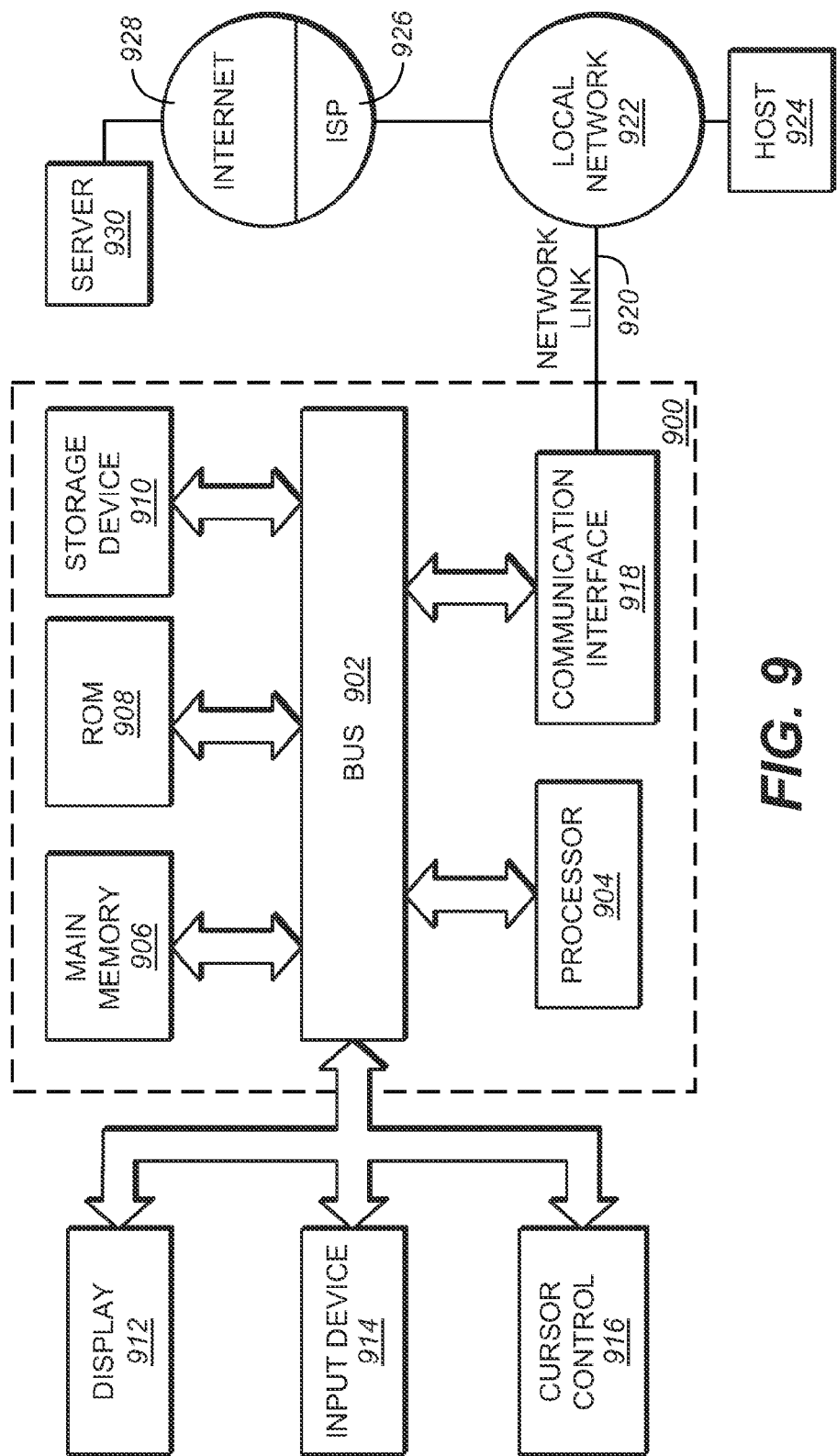
FIG. 9 illustrates an example hardware platform on which a computer or a computing device as described herein may be implemented.

For example, FIG. 9 is a block diagram that illustrates a computer system 900 upon which an example embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

10. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

I claim:

1. A method, comprising:
receiving a plurality of input images in an input video signal of a wide dynamic range, the specific input image is perceptually quantized with input code values independent of a display system based on a nonlinearity of human vision;
determining, based on a specific input image in the plurality of input images, a specific setting of global light modulation for each color channel, the specific setting of global light modulation producing a specific dynamic range window, an output luminance level range represented by the specific dynamic range window being a proper subset of a luminance level range represented by the wide dynamic range;
converting a plurality of input code values in the specific input image to a plurality of output code values in a specific output image corresponding to the specific input image for the specific setting of global light modulation for a first color channel, the plurality of output code values producing perceptually the same or substantially the same luminance levels as represented by the plurality of input code values, and the plurality of output code values being within the specific dynamic range window; and
converting one or more remaining input code values in the specific input image to one or more output code values in the specific output image for the specific setting of global light modulation for the first color channel, the one or more output code values producing perceptually different luminance levels as represented by the one or more input code values, and the one or more output code values being within the specific dynamic range window.

2. The method as recited in claim 1, wherein the plurality of input code values represents one or more salient portions of the specific input image.

3. The method as recited in claim 1, wherein at least one of the wide dynamic range or the specific dynamic range window represents a dynamic range with an upper limit having a value of:
less than 500 nits,
between 500 nits and 1000 nits, inclusive,
between 1000 and 5000 nits, inclusive, between 5000 nits and 10000 nits, inclusive,
between 10000 nits and 15000 nits, inclusive, or
greater than 15000 nits.

4. The method as recited in claim 1, wherein the dynamic range window represents a dynamic range with a lower limit having a value of:
less than 0.001 nits,
between 0.001 nits and 0.1 nits, inclusive,
between 0.1 nits and 1 nits, inclusive,
between 1 nits and 10 nits, inclusive,
between 10 nits and 100 nits, inclusive, or
greater than 100 nits.

5. The method as recited in claim 1, further comprising rendering the specific output image on a display screen with the specific setting of global light modulation.

6. The method as recited in claim 1, further comprising:
determining, based on a second specific input image in the plurality of input images, a second specific setting of global light modulation, the specific setting of global light modulation producing a second specific dynamic range window, the second specific dynamic range window being different from the specific dynamic range window;
converting a second plurality of input code values in the second specific input image to a second plurality of output code values in a second specific output image corresponding to the second specific input image, the second plurality of output code values producing the same or substantially the same luminance levels as represented by the second plurality of input code values.

7. The method as recited in claim 6, wherein the specific input image comprises same maximum and minimum luminance levels as the second specific input image, and wherein the specific dynamic range window comprises maximum and minimum luminance levels different from those of the second specific input image.

8. The method as recited in claim 1, wherein the input video signal comprises image data encoded in at least one of: a high-resolution high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space associated with the BT.709 Recommendation standard of the International Telecommunications Union (ITU), CIE color spaces as defined by International Commission on Illumination (CIE), a CIELAB color space, a CIELUV color space, a YCbCr color spaces, an IPT uniform color space, an LCh color space, or color spaces related to spectral encoding.

9. The method as recited in claim 1, wherein the specific setting of global light modulation comprises one or more specific settings for one or more of light source components or global light modulation components.

10. The method as recited in claim 1, wherein light illumination on a pixel-level or pixel-block-level light modulation layer with the specific setting of global light modulation is uniform.

11. The method as recited in claim 1, wherein light illumination on a pixel-level or pixel-block-level light modulation layer with the specific setting of global light modulation is non-uniform.

12. The method as recited in claim 1, wherein the wide dynamic range comprises input code values of a code space with a bit depth of at least one of:
less than 12 bits;
between 12 bits and 14 bits, inclusive;
at least 14 bits;
14 bits or more.

13. The method as recited in claim 1, wherein the specific dynamic range window is represented by output code values of a code space with a bit depth of at least one of:
less than 8 bits;
between 8 bits and 12 bits, inclusive;
12 bits or more.

14. The method as recited in claim 1, wherein the specific input image comprises an image-specific dynamic range that fits within the specific dynamic range window.

15. The method as recited in claim 1, wherein the specific input image comprises an image-specific dynamic range that does not fit within the specific dynamic range window.

16. An apparatus comprising a processor and memory, the memory storing variables during execution of instructions by the processor, wherein the processor and the memory are configured to perform the method recited in claim 1.

17. A non-transitory computer readable storage medium, storing software instructions, which when executed by one or more processors cause performance of the method recited in claim 1.

18. A computing device comprising one or more processors and one or more storage media, storing a set of instructions, which when executed by the one or more processors cause performance of the method recited in claim 1.

* * * * *